G. F. THOMPSON.
EVENER COUPLING.
APPLICATION FILED APR. 17, 1911.
Reissued Apr. 27, 1915. 13,907.
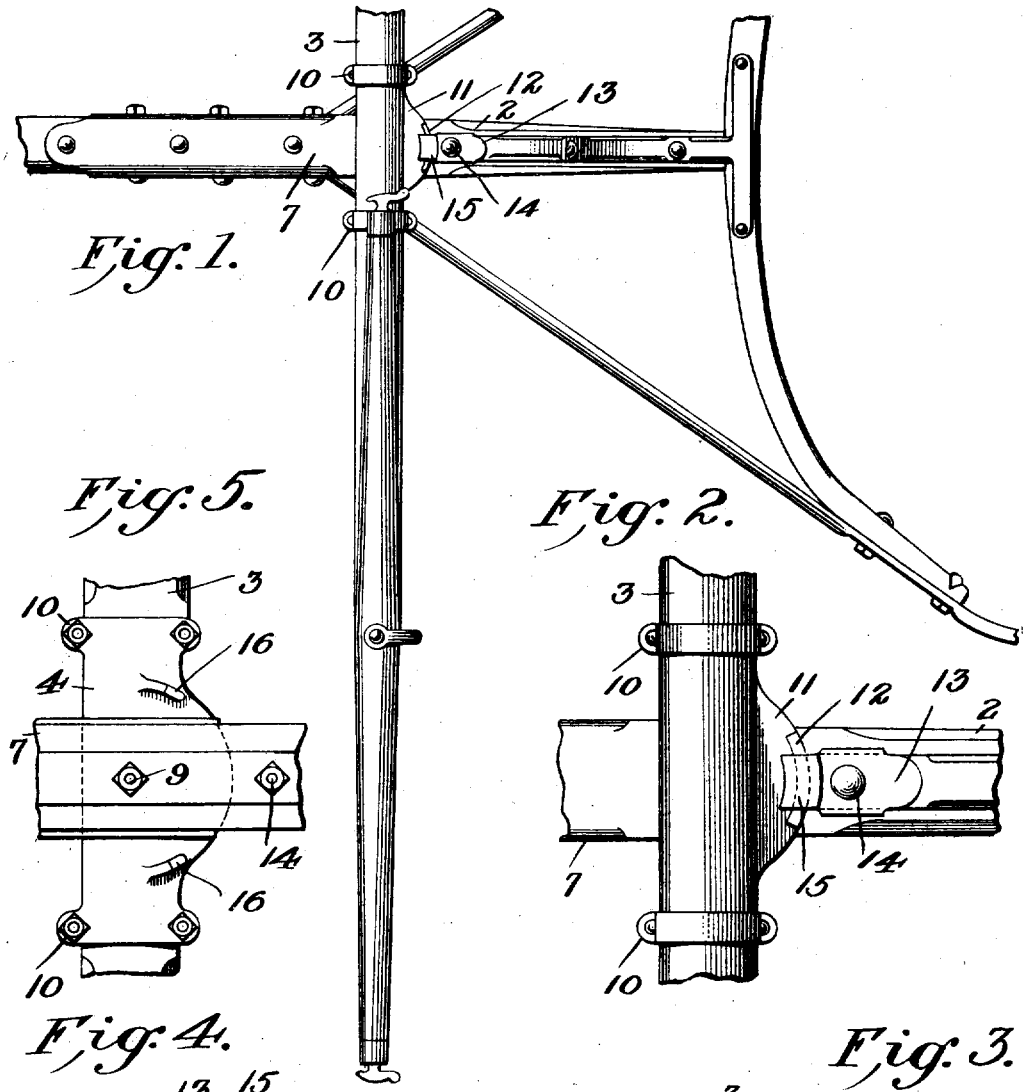
Witnesses
Jos J Collins
S. Jay Teller
Inventor
George F Thompson
By H. H. Bliss
Attorney
THE NORRIS PETERS CO., PHOTO-LITHO., WASHINGTON, D. C.

UNITED STATES PATENT OFFICE.

GEORGE F. THOMPSON, OF MINNEAPOLIS, MINNESOTA, ASSIGNOR TO AMERICAN PATENT HOLDING CO., OF MINNEAPOLIS, MINNESOTA, A CORPORATION OF MINNESOTA.

EVENER-COUPLING.

13,907. Specification of Reissued Letters Patent. Reissued Apr. 27, 1915.

Original No. 948,487, dated February 8, 1910, Serial No. 434,603. Application for reissue filed April 17, 1911. Serial No. 621,722.

*To all whom it may concern:*

Be it known that I, GEORGE F. THOMPSON, of Minneapolis, Hennepin county, Minnesota, have invented certain new and useful Improvements in Evener-Couplings, of which the following is a specification.

The object of my invention is to provide a coupling which will do away with the necessity of a hole through the center of the evener.

A further object is to provide an evener which will dispense with the stay straps usually required.

A further object is to provide an evener having means for holding it in a horizontal position on the pole and preventing it from tilting sidewise thereon.

A further object is to provide a support for the evener which will cause it to oscillate smoothly and evenly and prevent all danger or tendency of twisting.

My invention consists generally in various constructions and combinations, all as hereinafter described and particularly pointed out in the claims.

In the accompanying drawings forming part of this specification, Figure 1 is a plan view of a portion of a pole and evener with my invention applied thereto. Fig. 2 is a detail view showing the application of the evener to the pole. Fig. 3 is a sectional view illustrating the manner of mounting the evener on the pole. Fig. 4. is a sectional view on the line *x—x* of Fig. 3 looking in the direction of the arrow. Fig. 5 is a view of the under side of the pole and evener.

In the drawing, 2 represents a pole made in one piece or with the heel and straight portion made separately as described in my companion application for buggy poles, filed May 23rd, 1908, Ser. No. 434,604.

3 is the evener and 4 a coupling plate having a hollow tapered stud 5 depending therefrom and fitting within a hub 6 on the cap plate 7, a tapered socket 8 being provided in the pole to receive said hub. The cap plate has flanges depending on each side of the pole. A bolt 9 passes down through the stud and the pole and secures the coupling plate thereon, but allows it to oscillate with the evener. The coupling plate rests on the top plate and has end portions projecting laterally on each side and secured to the evener. The bolt fitting within the hollow stud has its head in engagement with the evener coupling plate and a nut on its lower end in engagement with the bottom plate of the pole. The ends of the plate 4 are provided with clamps 10 which rigidly secure the plate and the evener together. The evener is thus mounted on the pole without the necessity of forming a hole in the evener to weaken it, and the arrangement of the clamps on each side of the evener center makes the evener stronger than one made in the usual way, as the leverage from the ends of the evener to the clamps is less than it would be to the center of the evener. I can thus safely make the evener of lighter stock, if desired.

By the use of the stud and hub connecting the evener with the pole I am able to avoid all wear on the bolt 9 and prevent the evener from working loose and tilting sidewise on its pivot, a frequent occurrence in eveners as usually made. The coupling plate has a rearwardly projecting flat flange 11 terminating in an upwardly projecting edge 12, and a plate 13 is secured to the pole by a bolt 14 and has a hook portion 15 overhanging the flange 12 and forming a guide therefor, the flange and the hook being curved to allow the oscillation of the evener on its pivot.

This construction insures a broad bearing surface for the evener coupling on the pole and prevents any twisting tendency of the evener, it being necessary to remove two bolts before the evener and coupling plate can be removed.

The rearwardly extending portion of the coupling plate and the hammer strap bearing thereon and the projection of said coupling plate in front of the socket permit free horizontal oscillation of the evener, but prevent a rolling forward movement.

I also provide on the bottom of the coupling plate on each side of the pole, lugs 16 which allow a limited oscillation of the evener but engage the pole irons and prevent the evener from swinging beyond a predetermined point. I am thus able to do away entirely with stay straps usually required with buggy pole eveners.

It will be observed that lugs engaging directly with the rigid pole parts have certain peculiar advantages over those evener limiting means which have been heretofore proposed. By means of these lugs all shocks are transmitted directly to the heaviest and most rigid part of the structure, which is, of course, the pole itself. Furthermore the two lugs acting on opposite sides of the pole tend to compress it instead of to split or disrupt it, as would be the case, if the shocks were taken by small projections secured to the top of the pole at points between its sides.

My construction also has the advantage that a holder is provided for the evener coupling plate, this holder being separate from the cap plate of the pole and separately attached to the pole. The holder by engaging with the top of the coupling plate aids in preventing any movement of the plate away from the pole, and this is done without any strain being transmitted to the cap plate.

I claim as my invention:

1. The combination, with a pole having a tapered socket extending therethrough, of top and bottom plates for said pole, said top plate having flanges depending on each side of said pole, and a hub fitting within said socket, an evener, a coupling plate adapted to rest on the top plate of said pole and having end portions projecting laterally on each side and secured to said evener, said coupling plate having a hollow tapered stud fitting within said hub, and a bolt fitting within said hollow stud and having its head in engagement with said evener coupling plate, and a nut on its lower end in engagement with the bottom plate of said pole, substantially as described.

2. The combination, with a pole having a socket therein, of top and bottom plates for said pole, said top plate having a hub fitting within said socket, an evener, a coupling plate resting on the top plate of said pole and having end portions projecting laterally on each side thereof, and means for securing said end portions to said evener, said coupling plate having a flat flange projecting rearwardly therefrom, and said flange having a broad bearing surface on said top plate and provided with a curved upwardly turned rear edge, a hammer strap secured to said pole and provided with a hook at its forward end which overhangs the upwardly turned edge of said flange, and means for clamping said hammer strap on said pole in the rear of and close to the point where its hook engages the upwardly-turned edge of said flange, and said coupling plate projecting in front of the socket in said pole and bearing on said top plate and whereby horizontal oscillation of the evener will be permitted but a forward rolling movement is prevented.

3. The combination, with a buggy pole having a socket therein, of top and bottom plates secured to said pole, said top plate having depending flanges on each side thereof secured to said pole, and a hub fitting within the socket in said pole, an evener, a coupling plate having a stud fitting within said hub, and means for securing said stud therein, said coupling plate having end portions projecting laterally on each side of said pole, and means for securing said end portions to said evener, and said end portions having depending lugs cast integrally therewith on each side of said pole and adapted when the evener is oscillated to engage the depending flanges of said top plate and limit the oscillation of the evener thereon, substantially as described.

4. The combination with a vehicle pole and a transversely arranged evener, of a plate secured to the top of the pole and having a relatively large pivot aperture, a plate secured to the bottom of the evener and having a pivot boss fitting the said aperture a pivot bolt extending vertically through the said pivot aperture and through the said pivot boss, the said evener plate bearing upon the top plate of the pole on all sides of the said aperture, and a holder secured to the pole independently of the said top plate in the rear thereof and arranged to engage the top of the evener plate, substantially as described.

In witness whereof, I have hereunto set my hand this 4th day of March, 1911.

GEORGE F. THOMPSON.

In presence of—
RICHARD PAUL,
GENEVIEVE E. SORENSEN.

Copies of this patent may be obtained for five cents each, by addressing the "Commissioner of Patents, Washington, D. C."